United States Patent [19]

Gage

[11] Patent Number: 4,890,221

[45] Date of Patent: Dec. 26, 1989

[54] APPARATUS AND METHOD FOR RECONSTRUCTING A MICROSTACK

[75] Inventor: Lindsay D. Gage, Arlington, Mass.

[73] Assignee: Digital Equipment Corporation, Maynard, Mass.

[21] Appl. No.: 176,609

[22] Filed: Apr. 1, 1988

[51] Int. Cl.[4] .............................................. G06F 9/00
[52] U.S. Cl. .................................. 364/200; 364/231.8; 364/244; 364/244.3; 364/261.3; 364/261.6
[58] Field of Search ........................ 364/200, 300, 900

[56] References Cited

U.S. PATENT DOCUMENTS

| 4,719,565 | 1/1988 | Moller ................................ 364/200 |
| 4,748,556 | 5/1988 | Hoeren et al. ...................... 364/200 |
| 4,777,587 | 10/1988 | Case et al. ......................... 364/200 |
| 4,807,185 | 2/1989 | Kamiya ............................... 364/900 |

Primary Examiner—Raulfe B. Zache
Attorney, Agent, or Firm—Kenyon & Kenyon

[57] ABSTRACT

An arrangement and method for restoring a stack which issues a trap handler address for responding to trap occurrences, and which receives addresses of computer instructions from a pipeline, stores and returns these addresses to the pipeline. The arrangement has locations for receiving, storing and returning the addresses. A linked listing of the order in which the addresses to be returned by the stack is maintained. A restoration silo restores the stack from the linked listing after the trap handler address issuance into a state which is the same as if no trap had occurred.

23 Claims, 3 Drawing Sheets

| LOCATION | ADDRESS |
|---|---|
| 0 | 100 |
| 1 | 200 |
| 2 | 300 |
| 3 | 310 |
| 4 | 320 |
| 5 | ... |

LOCATION AT STACK POINTER FOR EACH STEP
← A
← B ← D ← H
← C
← E ← G
← F

STACK POINTER 38

LINK 36

| STEP | INSTRUCTION | CONTROL BIT | STACK POINTER |
|---|---|---|---|
| a. | 100: CALL 200 | 1 | 0 |
| b. | 200: CALL 300 | 1 | 1 |
| c. | 300: CALL 400 | 1 | 2 |
| d. | 400: RETURN | 0 | 1 |
| e. | 310: CALL 500 | 1 | 3 |
| f. | 320: CALL 600 | 1 | 4 |
| g. | 600: RETURN | 0 | 3 |
| h. | 500: RETURN | 0 | 1 |

| h | g | f | e | d | c | b | a | |
|---|---|---|---|---|---|---|---|---|
| 3 | 4 | 4 | 3 | 2 | 2 | 1 | 0 | STACK POINTER |
| 0 | 0 | 1 | 1 | 0 | 1 | 1 | 1 | CONTROL BIT |

| BEFORE | | | AFTER TRAP HANDLER ADDRESS ISSUANCE | | |
|---|---|---|---|---|---|
| LOCATION | ADDRESS | VALID BIT | LOCATION | ADDRESS | VALID BIT |
| 0 | 100 | 1 | 0 | 100 | 1 |
| 1 | 200 | 1 | 1 | 200 | 1 |
| 2 | 300 | 1 | 2 | 300 | 0 |
| 3 | 310 | 1 | 3 | 310 | 0 |
| 4 | 320 | 1 | 4 | 320 | 0 |

APPARATUS AND METHOD FOR RECONSTRUCTING A MICROSTACK

FIELD OF THE INVENTION

The present invention relates to the field of computer microhardware and the temporary storing of addresses in a computer microprogram to return to after a microsubroutine has been called. More specifically, this invention relates to restoration or reconstruction of a microstack which keeps track of the addresses from which the microprogram jumped to a microsubroutine, and the replaying of those microinstructions which occurred during a trap shadow.

BACKGROUND OF THE INVENTION

In microcoding, as in normal coding, in order to save microcode space, commonly-used microsubroutines are "callable". When a microsubroutine is called, the microcode program will jump to the appropriate microcode which begins the microsubroutine. At the end of the microsubroutine, a "return" causes the microcode program to return to the address in the main microcode program from which it jumped to the microsubroutine. Of course, there can be nesting so that the program will jump from one microsubroutine into another microsubroutine.

To keep track of the address from which the microprogram jumped (either from the main microprogram or microsubroutine), a microstack is used. When a jump to a microsubroutine is called, the address in the program which called for the jump is written into the microstack. The pointer in the microstack points to this address since it was the last one written into the microstack. When the microsubroutine signals for a return to the main program, the address is popped off the microstack and the program is returned to the address which called for the jump originally. The pointer is then updated to point to the address which is now the last one which was written into the microstack.

In some modern computers, pipelining of instructions is used in order to speed up the machine. In nonpipelined machines, a piece of data will completely pass through a series of operations before the next piece of data begins passing through the series. In a pipeline machine, by contrast, the next piece of data follows closely behind the first piece of data in entering the series of operations. In this manner, the second operation in the series will be operating on the first piece of data while the first operation in the series will be operating on the second piece of data to enter the series.

Although pipelining increases the speed of the machine, a problem occurs due to traps. A microtrap is an event which has not occurred properly in the machine, as detected by a parity bit, for example. When a microtrap occurs, the machine must take care of this problem. To increase the speed of the machine, a pipelined program continues to process instructions even though an instruction which causes a microtrap was initiated some time ago. When the computer recognizes that a trap has occurred a trap handler address is issued to cause the computer to go to some part of a program which will handle the trap. Because the machine has blindly continued processing pipelined instructions after the instruction which would cause the trap occurrence, the computer may not be in a proper state at the time of the issuance of the trap handler address. Accordingly, part of the restoration of the state of the computer is the reconstruction of the microstack to the state it should have been at the time of the issuance of the trap handler address or at the time of the trap occurrence, so that the reconstruction of the stack is invisible to the microcode.

In the prior art, instructions which were to be inputted to the stack were siloed before the stack. Bypasses from the silo to a multiplexer which was then connected to the stack provided for reconstructability of the microstack. The disadvantage of the prior art arrangement is the relatively large number of gates which need to be used.

An objective of the present invention is to provide an arrangement and a method for reconstructing a microstack so that the reconstruction is invisible to the microcode, while reducing the number of gates needed for performing this reconstruction.

SUMMARY OF THE INVENTION

This and other objectives of the invention are achieved in an arrangement in a computer which issues a trap handler address to respond to the occurrence of a trap for receiving addresses of computer instructions from a pipeline, storing and returning these addresses by providing a stack having locations for receiving, storing and returning the addresses, the stack having states. The arrangement includes means for maintaining a linked listing of the order in which the addresses are to be returned by the stack. The arrangement also includes means for restoring the stack from the linked listing after the trap handler address issuance into a state which is the same as if no trap had occurred.

The objective is also achieved by a method for restoring via a restoration silo a stack which receives, stores and returns addresses of computer instructions in stack locations, the stack having a stack pointer for pointing to the location having the next address which is to be returned from the stack, and means for changing the stack pointer to point to an available location when an address is received by the stack and to point to the location having the next address to be returned when an address has been returned by the stack. The method comprises writing an address into a stack location pointed to by the stack pointer and setting a valid bit at this stack location which prevents overwriting of the stack location until the valid bit is cleared. Simultaneously, a corresponding control bit is generated when an address is either written to or returned from the stack. The stack pointer is changed to point to a stack location in which the valid bit is not set when the stack receives an address and is changed to point to a stack location having the next address to be returned after the stack has returned an address. The method also includes siloing the control bits and the stack pointers associated with particular instructions and switching the stack to receive valid bits corresponding to control bits from a restoration silo after a trap has occurred and been recognized by the computer. Those valid bits are generated at the end of the trap shadow and are written into the stack. The valid bits at the stack locations pointed to by the siloed stack pointers are set or cleared in accordance with the siloed control bits.

By the embodiments of the method or apparatus described above, a linked listing of addresses in a microstack is achieved. To keep track of the listing, a reconstruction silo which needs only the control bits and stack pointer bits is used, thus reducing silo width from 14 bits to 5 bits. This considerably reduces the number of gates needed to implement a reconstructible microstack.

Another embodiment of the present invention achieves the objective of reducing the number of gates from prior art arrangements by providing an arrangement for receiving addresses of computer instructions from a pipeline, storing and returning these addresses, and restoring the arrangement after a trap in a computer occurs, by providing a stack which receives, stores and returns the addresses. This embodiment also includes a delay silo connected between the pipeline in the stack for delaying writing of the addresses to the stack by a first time period. A reconstruction silo having locations for receiving the instructions from the delay silo is also used. Each instruction is siloed in the reconstruction silo for a second time period. The invention further comprises means for clearing the delay silo so that instructions in the delay silo are not sent to the reconstruction silo or the stack, and for inputting the siloed instructions to the stack upon recognition of the trap by the computer so that the stack is restored to its state at the trap occurrence.

Another embodiment of a method to achieve the stated objectives in a computer for reconstructing a stack which receives instructions from a pipeline, after occurrence of a trap and issuance of a trap handler address, comprises the steps of siloing the instructions for a first time period at least equal to the time period between a trap occurrence and issuance of a trap handler address, clearing a portion of the instructions occurring between the instruction which caused the trap occurrence and the issuance of the trap handler address, and sending to the stack the remaining portion of the instructions occurring between the instruction which caused the trap occurrence and the trap handler address issuance.

These embodiments of the arrangement and method achieves the advantage of reducing the number of gates needed by using a combination of by-passing and reconstructing of commands or instructions. If the trap shadow, which is the time between an instruction which causes a trap occurrence and the issuance by the computer of a trap handler address, is a given amount of time, then the total number of commands which could be written to the stack in that time period must be accounted for. When this trap shadow is six commands long, for example, two of the commands which are normally delayed into the stack are simply cleared from the delay and never reach the stack. The remaining four commands are placed in a reconstruction silo after having passed through the delay silo. These four commands are then read back to the microstack and undo the changes which these commands had previously done to the stack. When the instructions are read from the reconstruction silo to the stack, they are inverted such that a return is read back to the stack as a call and a call is read back as a return so that the stack will be returned to its state prior to the occurrence of the trap, and will then proceed as if a trap had not occurred.

Other objects, features and advantages of the present invention will be apparent from the accompanying drawings and from the detailed description which follows below.

DETAILED DESCRIPTION

Figure 1:
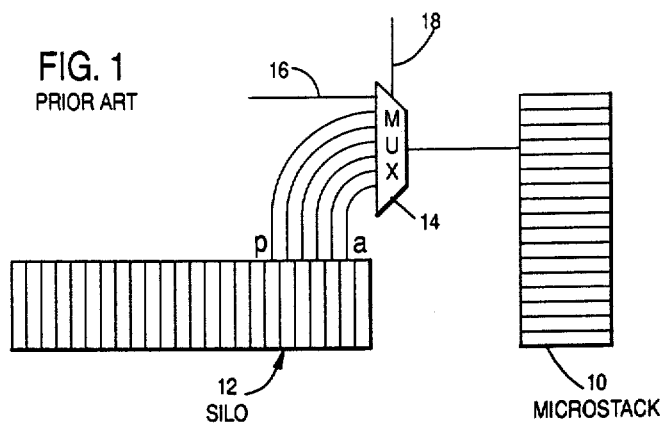
FIG. 1 shows a prior art arrangement for reconstructing a microstack.

Microstack hardware is responsible for storing and returning addresses in a correct order for microsubroutine calls and returns. The prior art solution shown in FIG. 1 comprises a microstack 10, a silo 12 and a multiplexer 14. During normal operation, addresses to be written to the microstack 10 are input to both the multiplexer 14 and the silo 12. This address is carried to the multiplexer 14 on line 16, and the select line 18 carries the select signal which causes the signal on line 16 to be output to the microstack 10. The address is also input to the silo 12, which has a number of stack locations. The addresses are siloed for a period of time at least equal to a trap shadow, and then fall off the silo. However, when a trap occurs, the select signal 18 causes the multiplexer 14 to sequentially select each of lines a-p, which are connected to consecutive locations in the silo 12. Thus, the siloed instructions are replayed to the microstack 10 in their proper order. Although this approach is workable, it is very expensive in terms of the number of gates needed for the multiplexer 14, as well as the number of gates needed to silo the bits of an entire address.

Figure 2:
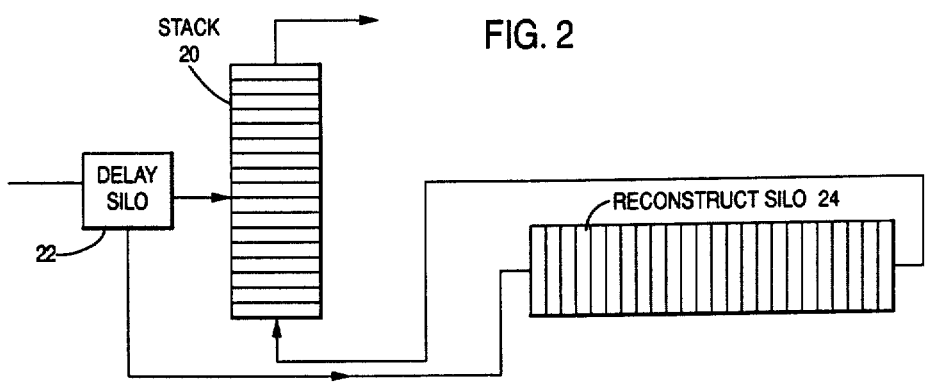
FIG. 2 shows an embodiment of the present invention for reconstructing a microstack.

A more gate-economical arrangement is illustrated in the embodiment of the present invention in FIG. 2. The hardware to perform the task of storing addresses comprises a 16-deep stack 20, a two-command delay silo 22 used for delaying writes to the stack 20, a four-command reconstruct silo 24 and control logic.

Upon receiving a call microinstruction, the stack 20 will write the address of the microinstruction which called. To return the program from the microsubroutine which had been called, a return is received by the microstack 20 which then "pops" off the address which had been written into it. As is common, a bit is flipped in the address so that the program is returned to at a slightly different address than that in which the call originated. Thus, if microinstruction 200 called, then the program will be returned to microinstruction 208, for example, if bit 4 was flipped upon the return of the address. The program then proceeds from that address.

For every return, there has to be a corresponding call. However, it is possible for the microcode to do several calls before returning so that there is a nesting @f microsubroutines. To provide for this, the stack 20 is implemented in a circular fashion. In an extreme case, if seventeen successive calls are made, the seventeenth call will cause the corresponding address to be placed in the stack 20 over the address corresponding to the first call, since the stack 20 is sixteen deep.

As explained earlier, when a trap occurs, the machine will go on blindly for a specified number of cycles (or commands) before the trap condition is recognized, this number of commands being known as the trap shadow. What is needed is to back the machine up to the point where the trap occurred. A problem exists in that the commands the machine has performed during the trap shadow may have changed the state of the microstack 20. Accordingly, the microstack 20 has to be put into the same state it was in at the time of the trap or should have been in at the time a trap handler address is issued, in a manner that is "invisible" to the microcode flow.

In the exemplary embodiment illustrated in FIG. 2, the largest trap shadow is six commands long. There could then be six changes to the microstack 20 by the time a trap is recognized and a trap handler address is issued. To account for these possible six microstack changes in restoring a microstack 20, the illustrated embodiment of FIG. 2 uses a combination of by-passing and reconstruction.

Before data is written into the stack 20, it must first pass through the delay silo 22, where it is delayed for two commands. In the normal case, the data is then written into the stack 20. However, if the data is needed before the delay period of two commands is over, delay logic collects the data from the delay silo 22 and sends it off to the pipeline. This data is never written into the stack 20 and is cleared from the delay silo 22. Upon a trap occurrence, the possible two stack operations in the delay silo 22 are cleared, accounting for two of the possible six commands in the trap shadow that may need to be undone.

The remaining four commands in the trap shadow are accounted for by reconstruction of the stack 20 using the reconstruction silo 24. These are commands that have already passed through the delay silo 22 and on into the reconstruction silo 24. All the stack changes within the maximum trap shadow are recorded in the reconstruction silo 24. These include both the call and return instructions which cause values to be written into or popped off of the stack 20. At the end of the trap shadow, the microinstructions simply fall off the reconstruction silo 24 since they would not be needed to reconstruct the stack 20 as they did not occur during a trap shadow.

When the microinstructions get to the reconstruction silo 24, a change bit is assigned to the microinstruction, indicating if this microinstruction changed the stack 20, either by a call or a return. If the microinstruction did change the stack 20, it is assigned a one, otherwise, it is assigned a zero. A silo pointer points to the location in the reconstruction silo 24 having the most recent change bit set to one.

When a trap occurs, at the end of the trap shadow, a trap handler address is issued so that the machine can deal with the trap. At the same time as this trap handler address is issued, reconstruction of the microstack 20 begins. As discussed above, the last two possible stack commands, which are in the delay silo 22, will never actually write the stack in this instance because of the two-command delayed stack write time, and are cleared from the delay silo 22.

At the same time, the input to the stack 20 is switched from the delay silo 22 to the reconstruction silo 24. The silo pointer will point to the first correct silo location which contains the microinstruction that last changed the stack, which is the location having the most recent change bit set to one. This microinstruction is then released out of the reconstruction silo 22 and is input to the microstack 20. The countdown mechanism counts down from the silo pointer position and sequentially enables each silo position which has a change bit set. These micrinstructions are input into the microstack 20. In this way, the microinstructions which were the last to enter the reconstruction silo 24 and change the microstack 20 are the first released from the reconstruction silo 24 and input to the microstack 20.

As the microinstructions are released from the reconstruction silo 24, their corresponding control bits are inverted. Thus, a call becomes a return, and a return becomes a call hen it is input to the microstack 20. By releasing the siloed microinstructions in inverse order to how they entered the silo 24, inverting these microinstructions and inputting them into the stack 20, restoration of the stack 20 is accomplished. An example follows:

Assume that the stack points to 100 at a trap occurrence. During the trap shadow, six instructions have occurred, but the last two have never written the stack because they have been cleared. The four instructions which have changed the stack and are in the reconstruction silo occurred as follows:

Instruction

| |
|---|
| a. XXX:Return (returns 100) |
| b. 101:Call 200 |
| c. 200:Call 300 |
| d. 300:Return (returns 200) |

The state of the stack after each instruction is given below:

| At trap occurrence | 100 |
|---|---|
| After trap: | a (empty, 100 has been returned) |
| | b 101 |
| | c 101 |
| | 200 |
| | d 101 (200 has been returned) |

Thus, the stack pointer now points to 101 instead of 100. The siloed instructions are in the order below, with the top instruction being the last to enter the reconstruction silo.

| |
|---|
| d. return 200 |
| c. call 200 |
| b. call 101 |
| a. return 100 |

In order to restore the stack after the trap handler address is issued, the instructions are replayed from top to bottom, but are inverted so that the return becomes a call and vice versa. Thus, the instructions are now input to the stack in the order below;

| |
|---|
| d. call 200 |
| c. return 200 |
| b. return 101 |
| a. call 100 |

The state of the stack after each instruction is given below:

| At trap occurrence: | 101 |
|---|---|
| After trap: | |

```
                d. 101
                   200
                c. 101
                b. (empty, 101 has been returned)
                a. 100.
```

As can be seen by the above example, the stack is now restored to the state it was in at the time of the trap as if the microinstructions which occurred during the trap shadow had not occurred.

Figure 3:
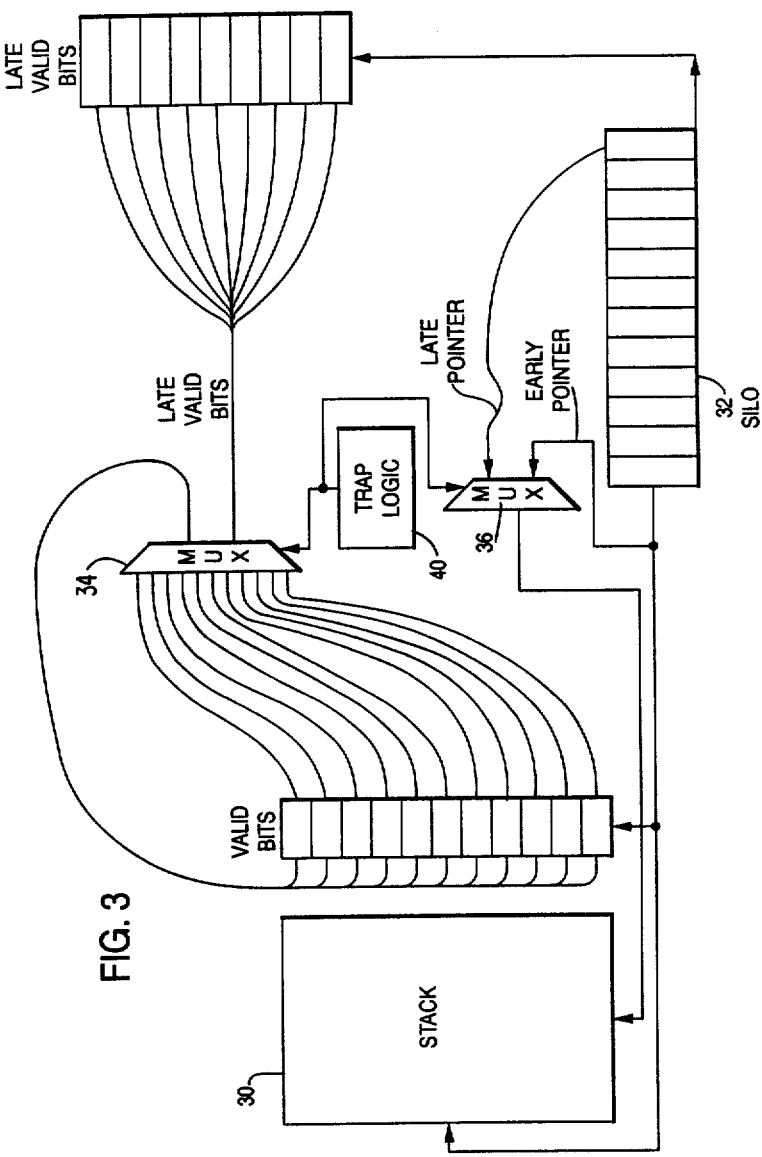
FIG. 3 shows a further embodiment of the present invention for reconstructing a microstack.

The embodiment of FIG. 3 illustrates a different arrangement for reconstructing a microstack in the event of a trap. This embodiment does not use a delay silo, and the restoration silo is considerably smaller than the reconstruction silo of the FIG. 2 embodiment. The microstack 30 is 10 deep by nineteen bits wide. The 19 bits are broken up into 14 bits of address, four bits of return pointer, and one valid bit. The microstack 30 includes the stack itself and a stack pointer to the stack. The stack pointer is changed when the stack receives a call instruction, so that the address which generated the call is written to the changed stack pointer location. In the event of a return, the stack pointer is already pointing to the correct location in the stack so that the return address is released and the stack pointer is then changed.

The address bits (13:0) represent the address of the microinstruction which generated the call. For example, if the microcode was "100: call 200", then the address bits (13:0) would be equal to 100.

The return pointer is the previous value of the stack value before it was changed so that the address generating the call instruction could be written into the stack 30. Upon a return, the return pointer becomes the new stack pointer. Four bits represent this return pointer. From this arrangement, a linked list of stack pointers is formed which keeps subroutine nesting in order. An example of this is shown below and graphically in FIG. 4, where individual links 36 between steps are shown, as well as the location of the stack pointer 38 after each microinstruction is received by the stack 30.

| Microinstruction | Stack Pointer | Return Pointer | Address at Stack Pointer |
|---|---|---|---|
| a. 100:call 200 | 0 | 0 | 100 |
| b. 200:call 300 | 1 | 0 | 200 |
| c. 300:call 400 | 2 | 1 | 300 |
| d. 400:return | 1 | 0 | 200 |
| e. 310:call 500 | 3 | 1 | 310 |
| f. 320:call 600 | 4 | 3 | 320 |
| g. 600:return | 3 | 1 | 310 |
| h. 500:return | 1 | 0 | 200 |

Figures 4, 5A, 5B, 5C:
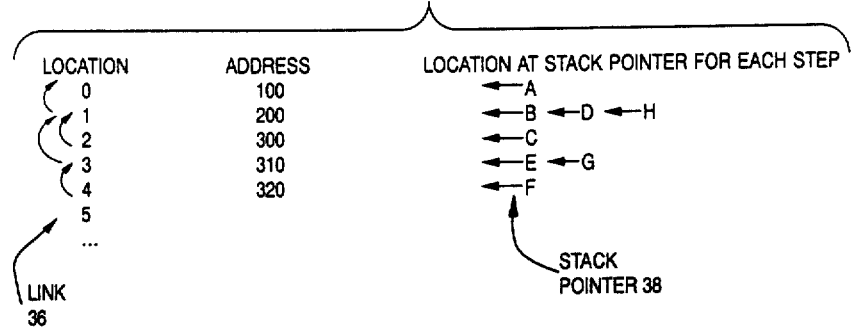
FIG. 4 shows a simplified representation of the microstack of FIG. 3 and the changes in location of a stack pointer which are caused by microinstructions.
FIG. 5a is an example of microinstructions with their corresponding control bits and the association of these control bits with a stack pointer.
FIG. 5b shows a schematic representation of a reconstruction silo according to an embodiment of the present invention.
FIG. 5c illustrates the state of the microstack after trap occurrence and after the issuance of a trap handler address.

In the above example and in FIG. 4, the locations pointed to by the stack pointer and the return pointer are given in decimal form rather than binary form, for sake of clarity in the example.

The last bit of each stack entry is the valid bit. It is this bit that prevents overwriting of the contents of the stack, which would otherwise have happened in stack location 2 when the instruction "310: call 500" was received by the stack 30 in the example given above. The valid bit is set when a call occurs and remains set when a return occurs. The valid bit is only cleared after the control for the return microinstruction has propagated down a silo 32 past trap time, as will be explained later.

The stack pointer 38 changes whenever there is a call or a return. When a call occurs, the control logic looks at the valid bits set in the stack 30 and determines where the next available stack location is for writing. The value of the next available stack location is then shifted into the stack pointer 38, and the address is written into the stack 30. The previous value of the stack pointer 38 becomes the return pointer, as explained above; this previous value is also written with the address to this new stack location. Upon a return, the value of the return pointer is shifted into the stack pointer to become the new stack pointer.

Instead of the entire contents of the stack (19 bits) being siloed as in the embodiment of FIG. 2, only the control bits for the stack 30 and the stack pointer 38 are siloed. When a return has been made, the stack pointer 38 is written into the silo and associated with a return control bit before this stack pointer 38 is updated to reflect the return. As seen in FIGS. 5a and 5b, at steps D, G and H, the value of the stack pointer 38 before it is updated is siloed, instead of the updated stack pointer, since these are return instructions. When a call has been made, the updated stack pointer 38 is siloed with the associated call control bit. In these Figures, the control for a call is a one and is a zero for a return.

As mentioned earlier, there is no overwriting of a location in a stack location which has a valid bit set. Even when a return has been made, the valid bit initially remains set. It is only after the control for this return has passed through the silo 32 past the trap shadow that the valid bit in the corresponding stack location is cleared, thereby allowing overwrites to that stack location.

Both the control bits and the stack pointer 38 are siloed out to trap time. At trap time, "late" valid bits are being generated in accordance with the control bits from the silo. When a call control bit comes through over the silo, the late valid bit is set. When a return control bit passes through, the late valid bit is cleared, as is also the valid bit in the stack location corresponding to the stack location associated with the return control bit. This clearing of the valid bit is done during both normal operation and after a trap occurs.

When a trap occurs, the siloed pointer replaces the stack pointer 38 and the late valid bits replace the stack valid bits. Restoration of the state of the stack 30 begins at the microinstruction at which the trap occurred and the silo 32 restores the stack from that point on by setting or clearing the valid bits in the stack 30 for those instructions which occurred during the trap shadow. Multiplexers 34 selectively connect the late valid bits and the stack (or early) valid bits to the stack 30. Multiplexers 36 selectively connect the stack pointer 38 and the siloed pointer to the stack 30. The multiplexers 34 and 36 are controlled by trap logic 40. Thus, the machine is backed up and the microinstructions to the stack 30 that were in the trap shadow are re-performed so that the stack 30 is put into the state it would have been in had no trap occurred, with the proper valid bits set. The remaining contents of each stack location remains undisturbed.

FIG. 5c shows the state of the stack after trap occurrence, and after the resetting of valid bits corresponding to instructions a-h after a trap handler address issuance. Note that in the stack after the trap handler address issuance, the valid bits in locations 2-4 have been cleared. This is because the control bits for the returns have gone through the silo past trap time and there is no longer any need to protect these locations from overwrites. Before the trap, the contents of stack locations 2-4 were returned, but the valid bits remained set, and will stay set if there is no trap until the return control bits have been siloed past trap time. The state of the stack after the trap handler address issuance accurately reflects the state of the stack before the trap, since locations 0 and 1 contain valid addresses and locations 2-4 contain returned addresses and can be written over.

As can be seen, the stack 30 is written as the calls occur, so that addresses are generated by the stack 30 in only one cycle in the event of a call or return. When there is a return, the address is returned but the stack location that was returned from is not available for writes by subsequent calls until after the control which caused the return reaches the end of the control silo. By not overwriting the contents of this stack address, the value of the return address is protected from the effects of microtraps.

The linked list structure allows the pointer to jump over stack entries which are still being protected from traps.

A ten-deep stack is used in order to effectively have an eight-deep stack. This is due to the fact that a control bit on a return will not clear the valid bit until after the control bit can pass through the silo. If eight stack locations have valid bits set and a return instruction comes through, followed immediately by a call instruction, the call would be lost since it cannot overwrite a location until after the return goes through the silo 32. To accommodate such situations, two extra stack locations are added to an eight-deep stack. In the time it takes to fill these two extra stack locations, the return control bit will have passed through the silo, allowing the next call to overwrite a corresponding location. Thus, the stack 30 will act like an eight-deep stack even though overwrites are not allowed until after the return control has passed through the silo 32.

By simply addling two locations to an eight-deep stack to give some flexibility, the linked list silo is reduced from 14 bits as in the FIG. 2 embodiment, to five bits (four for the stack pointer and one for the control bit). This produces a substantial savings in the total number of gate arrays.

In the foregoing specification, the invention has been described with reference to a specific exemplary embodiment thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An arrangement, in a computer which issues a trap handler address to respond to occurrence of a trap, for receiving addresses of computer instructions from a pipeline, storing and returning said addresses to said pipeline, said arrangement comprising:
   a stack having locations for receiving, storing and returning said addresses, said stack having states;
   means for maintaining a linked listing of an order in which said addresses are to be returned by said stack, said means for maintaining being coupled to said stack; and
   means for restoring said stack from said linked listing after said trap handler address issuance into a state which is equivalent to a state said stack would have if no trap had occurred, said means for restoring being coupled to said stack.

2. The arrangement of claim 1, further comprising a stack pointer in said stack for pointing to a location having a next address to be returned from said stack, and means for changing said stack pointer to point to: an available location when an address is received by said stack; and a location having the next address to be returned when an address has been returned by said stack.

3. The arrangement of claim 2, wherein said means for restoring include means for siloing said stack pointer corresponding to a particular instruction for at least a period of time equal to a trap shadow time, said trap shadow time being a period of time between said trap occurrence and said trap handler address issuance, said siloed stack pointer serving as said linked listing.

4. The arrangement of claim 3, wherein said stack includes said means for maintaining a linked listing.

5. The arrangement of claim 4, wherein each said location in said stack includes a valid bit which is set upon said location receiving an address to prevent overwriting of said location until said valid bit is cleared.

6. The arrangement of claim 5, wherein said means for restoring further includes means for siloing control bits which indicate if said stack has either received or returned an address for a particular instruction.

7. The arrangement of claim 6, wherein said means for siloing control bits siloes said control bits for at least said trap shadow time.

8. The arrangement of claim 7, wherein said means for restoring further includes means for clearing a valid bit of a location after a control bit indicating an instruction which has caused said stack to return an address has been siloed past said trap shadow time.

9. The arrangement of claim 8, wherein said control bit for a particular instruction is input in said means for restoring along with: said siloed stack pointer if said instruction causes said stack to receive an address; and a previously siloed stack pointer if said instruction causes said stack to return an address.

10. The arrangement of claim 9, wherein each stack location has a return pointer for pointing to the stack location having the next address to be returned.

11. The arrangement of claim 10, further comprising means for switching input of said stack from said pipeline to said means for restoring, and for clearing and setting valid bits in said locations pointed to by those siloed stack pointers which are within said trap shadow time as a function of said siloed control bits.

12. The arrangement of claim 11, wherein said stack has at least N+1 locations to effectively provide an N-deep stack.

13. A method for restoring by a restoring silo a stack, having stack locations, which receives, stores and returns addresses of computer instructions in the stack locations, said stack having a stack pointer for pointing to the stack location having a next address which is to be returned from the stack and means for changing the stack pointer to point to an available stack location when an address is received by said stack, and to point to the stack location having the next address to return when an address has been returned by said stack, said method comprising the steps of:
   writing an address into a stack location pointed to by said stack pointer and setting a valid bit at said stack location which prevents overwriting of said stack location until said valid bit is cleared;
   simultaneously generating a corresponding control bit when an address is either written to our returned from said stack;

changing the stack pointer to point to a stack location in which said valid bit is not set when said stack receives an address;

changing the stack pointer to point to a stack location having a next address to be returned after said stack has returned an address;

siloing control bits and said stack pointer to create siloed control bits and siloed stack pointers;

switching the stack to receive input from a restoring silo after a trap has occurred and been recognized by said computer; and setting and clearing valid bits at said stack locations pointed to by said siloed stack pointers as a function of said siloed control bits.

14. The method of claim 13, further comprising: clearing said valid bit for a stack location when a control bit corresponding wit a return of an address has been siloed for at least a period of time equal to a time period between a trap occurrence and recognition of said trap occurrence by said computer.

15. The method of claim 14, further comprising writing of a return pointer into a particular stack location along with a address, said return pointer being a value of said stack pointer before said stack pointer was changed to write to said particular stack location.

16. An arrangement for receiving addresses of computer instructions from a pipeline, storing and returning said addresses, and restoring said arrangement after a trap in the computer occurs, said arrangement comprising:

a stack for receiving, storing and returning said addresses;

a delay silo coupled between said pipeline and said stack for delaying writing of said address to said stack by a first time period;

a reconstruction silo, coupled to said delay silo, that receives said instructions from said delay silo, and which siloes each said instruction received from said delay silo for a second time period; and means for clearing said delay silo such that instructions in said delay silo are not sent to said reconstruction silo or to said stack, and for inputting said instructions siloed in said reconstruction silo to said stack upon recognition of said trap by said computer such that said stack is restored to its state at occurrence of a trap.

17. The arrangement of claim 16, wherein a maximum period of time between said trap and said recognition of said trap is equal to or less than a sum of said first and second time periods.

18. The arrangement of claim 16, further comprising means for bypassing said stack with said instructions in said delay silo if said instructions are needed by said computer before said first time period is over.

19. A method in a computer for reconstructing a stack which receives instructions from a pipeline, after occurrence of a trap and issuance of a trap handler address by said computer, said method comprising the steps of:

siloing said instructions for a first time period at least equal to the time period between an instruction which caused a trap occurrence and issuance of a trap handler address;

clearing a portion of said instructions occurring between said instruction which caused said trap occurrence and said trap handler address issuance; and sending to said stack a remaining portion of said instructions occurring between said instruction which caused said trap occurrence and said trap handler address issuance.

20. The method of claim 19, further comprising: delaying writing of said instructions to said stack from said pipeline by a first time period.

21. The method of claim 20, wherein those instructions which are being delayed are those instructions which are being cleared.

22. The method of claim 21, wherein said sending step includes sending said instructions to said stack in inverse order to an order in which said instruction were siloed in said siloing step.

23. The method of claim 22, wherein said sending step further includes inverting each said instruction before sending said instruction to said stack.

* * * * *